United States Patent [19]

Kanda et al.

[11] 4,157,903
[45] Jun. 12, 1979

[54] SEPARATION AND RECOVERY APPARATUS FOR SOLID OR LIQUID PARTICLES ENTRAINED IN A FLOWING GAS MIXTURE

[75] Inventors: Masao Kanda; Hiroaki Nakamura, both of Fujinomiya, Japan

[73] Assignee: Fuji Photo Film Co., Ltd., Minami-ashigara, Japan

[21] Appl. No.: 893,862

[22] Filed: Apr. 6, 1978

[30] Foreign Application Priority Data

Apr. 11, 1977 [JP] Japan .................................. 52/41080

[51] Int. Cl.² ........................ B01D 45/16; B05C 11/10
[52] U.S. Cl. .................................. 55/393; 55/459 C; 55/461; 118/63; 118/600; 51/425
[58] Field of Search ................... 55/201–203, 55/206, 447, 459 C, 461, 462, 392, 393, 422; 118/63, 102, 600; 34/79; 51/425; 209/143, 144

[56] References Cited

U.S. PATENT DOCUMENTS

| 535,099 | 3/1895 | Gale et al. ......................... 55/461 |
| 3,202,536 | 8/1965 | Brezinski ........................... 118/63 |
| 3,229,447 | 1/1966 | Kosta .................................. 55/95 |
| 3,397,673 | 8/1968 | Mahoney et al. ................. 118/63 |
| 3,710,561 | 1/1973 | Garrone ............................. 55/461 |
| 3,871,326 | 3/1975 | Kaneda et al. .................... 118/63 |
| 3,948,771 | 4/1976 | Bielefeldt .......................... 55/461 |
| 4,001,121 | 1/1977 | Bielefeldt .......................... 55/461 |

Primary Examiner—Frank W. Lutter
Assistant Examiner—David L. Lacey
Attorney, Agent, or Firm—Sughrue, Rothwell, Mion, Zinn and Macpeak

[57] ABSTRACT

Excess coating material removed from a coated web 1 by an air doctor 6 and entrained in the exciting gas mixture flow 8 is directed along a plate 9 to effect primary coating material separation and recovery in a chamber 11, whereafter the flow passes along an inwardly spiraling apparatus wall 14 which terminates in an air exhaust duct 16. The wall 14 initially continues the prolongation or extension plane of the plate 9, and includes secondary recovery chambers 13 and 15, whereby separation is implemented by both centrifugal and gravitational forces. The same concepts may also be used to recover solid particles in a surface abrasion apparatus such as a sand blaster.

3 Claims, 5 Drawing Figures

SEPARATION AND RECOVERY APPARATUS FOR SOLID OR LIQUID PARTICLES ENTRAINED IN A FLOWING GAS MIXTURE

BACKGROUND OF THE INVENTION

This invention relates to apparatuses for separating and recovering liquid or solid particles suspended in a forced gas flow.

The separation and recovery of liquids or solids suspended in a gas flow is often required in air knife coating devices, sand blasting devices, etc. In the air knife coating method, the surface of a continuously running web of metal or some other material is coated with coating material or the like by an applicator roll or a liquid injector, and the excess coating is thereafter removed by an air jet blown against the web surface to thereby control the coating thickness and smooth the web surface. Accordingly, it is necessary to separate the removed coating material from the air flow and recover it for reuse.

In sand blasting, an abrasive such as sand is blown under pressure against the surface of a web such as a plastic film, a metal plate or the like to abraid, polish or matt the surface, whereby it is similarly necessary to separate and recover the abrasive.

Recovery apparatuses for air knife or sand blast coating devices are disclosed in U.S. Pat. Nos. 3,229,447, 3,397,673 and 3,550,553, and in Japanese Patent Application Publication No. 33023/1971. A typical one is shown in FIG. 1, wherein a coating roll 2 picks up coating material 4 from a pan 3 and applies it to a continuously running web 1. The amount of coating material applied to the web exceeds a predetermined value. While the coated web is supported by a backing roll 5, an air jet from a slit-shaped nozzle 7 of an air doctor 6 is blown against the web surface to remove excess coating material therefrom so that the remaining amount of coating material reaches the predetermined value. A mixture 8 of air and removed coating material is deflected by a separating plate 9 and flows along a guide board 10 disposed below the separating plate. The direction of the air mixture flow is changed at the end of the guide board, whereby the heavier than air coating material is separated from the air flow and collected in a first chamber 11. The air mixture flow containing some residual coating material is then directed along an opposite wall 12 of the recovery apparatus to undergo a further change of direction, whereby the residual coating material is collected in a second chamber 13 and the air is thereafter discharged from the system.

When the air mixture strikes the plate 9 some coating material is separated from the air, but since the flow path is directed along the guide board 10 without collecting the separated coating material, it is facilitated that some of such separated coating material is reentrained, thereby lowering the efficiency of the apparatus. Furthermore, the air flows back across the separated coating material which drops of the end of the guide board 10 to thereby reentrain some of such coating material and further reduce the efficiency of the apparatus.

To avoid such difficulties an improved recovery apparatus was developed, as disclosed in Laid-Open Japanese Patent Application No. 21423/1974. In this apparatus, as shown in FIG. 2, a first chamber 11 is provided just below the end of a separating plate 9 to immediately collect the coating material 4 which has been initially separated from the air mixture. The air mixture containing residual coating material thereafter strikes the wall 12 of the recovery apparatus opposite the separating plate 9, and flows along such wall. The coating material separated during this period is collected in a second chamber 13. The air mixture continues past the chamber 13 along the prolongation line of the wall such that its direction is changed, as a result of which any remaining coating material is collected in a third chamber 14 while the air is discharged through a duct 15. In this apparatus the separated coating material falling from the end of the plate 9 is not disturbed by any cross-flow of the mixture 8, thereby more effectively maintaining the separation.

In this apparatus, however, the air mixture flowing along the separating plate 9 strikes against the apparatus wall confronting the plate and thereafter follows along the wall. Accordingly, the partially separated coating material is scattered or reentrained in the air flow as a result of such striking, which decreases the separation efficiency. Further, some of the energy provided by the air doctor is lost because of the striking, whereby the centrifugal separating force cannot be as effectively utilized. Furthermore, because of the unsmooth air flow the pressure loss is sometimes increased, or some air having coating material entrained therein is wastefully discharged outside the apparatus, which leads to air pollution.

SUMMARY OF THE INVENTION

Accordingly, an object of this invention is to solve the above-described problems accompanying the prior art and to provide a more efficient separation and recovery apparatus for an air knife coating device or a sand blasting device.

The foregoing object is achieved by directing the gas mixture flow along a separating plate to effect a primary separation of coating material or sand from the gas mixture, whereafter secondary separation is implemented by configuring the apparatus walls to initially follow the prolongation plane of the separating plate and thereafter turn inwardly in the manner of a spiral having a generally decreasing radius of curvature. Such a construction enhances the centrifugal and gravitational separation effects, and reduces the pressure loss within the apparatus.

DETAILED DESCRIPTION OF THE PREFERRED EMBODIMENTS

Figure 1:
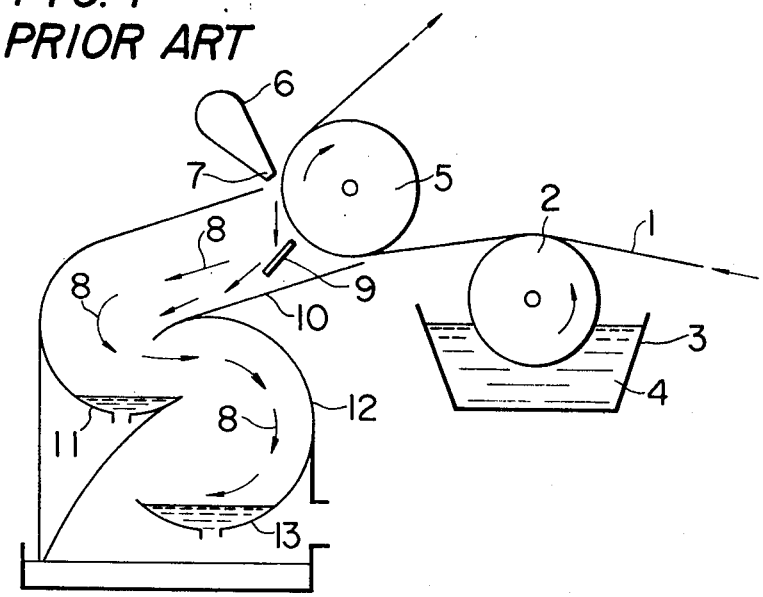
FIGS. 1 and 2 show schematic sectional views of conventional coating material recovery apparatuses.
Figure 2:
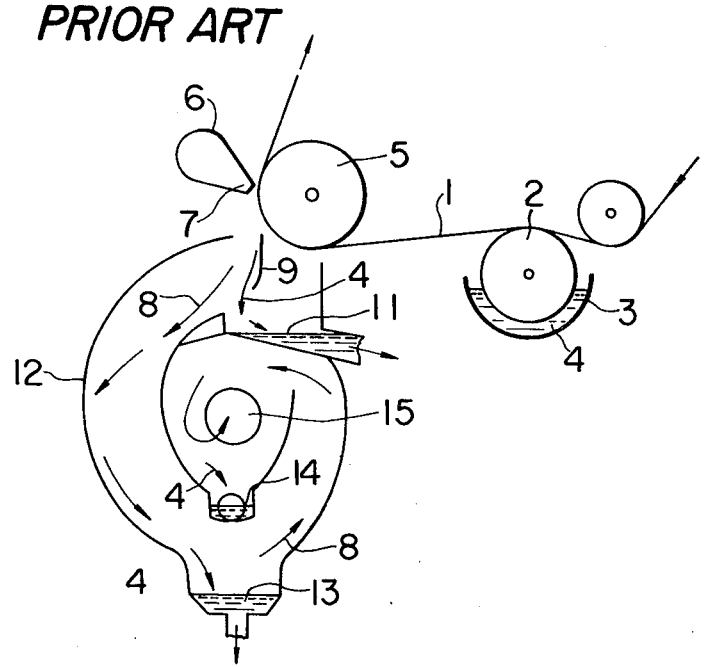
Figure 3:
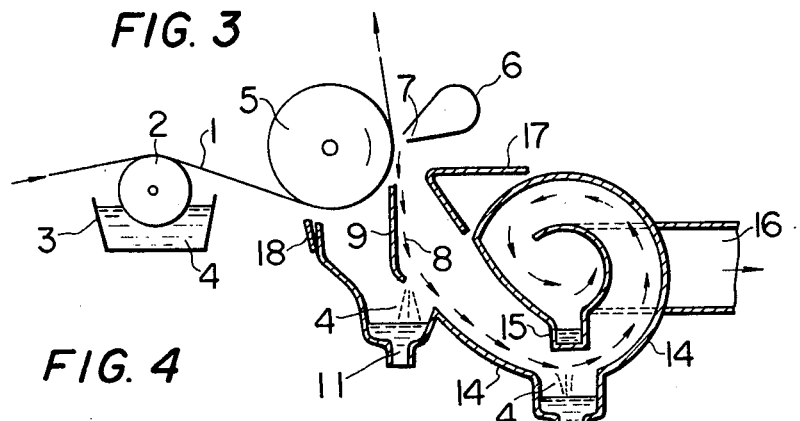
FIGS. 3 and 5 show schematic sectional views of coating material recovery apparatuses according to this invention.

Referring to FIG. 3, coating material 4 such as a paint or the like, in a pan 3 is picked up by a coating roll 2 and applied to a continuously running web 1 in an excessive amount or thickness. With the coated web supported by a backing roll 5, an air jet from the slit-shaped nozzle 7 of an air doctor 6 is applied to the web surface to remove the excess coating material therefrom and reduce the coating thickness to a desired value. The air and coating material mixture 8 flows down along a separating plate 9 disposed below the air doctor 6 whereby some coating material is initially separated from the air and collected in a first chamber 11 disposed immediately below the end of the separating plate 9. The mixture 8 continues to flow along the wall 14 of the apparatus which follows the prolongation line of the separating plate, thereby subjecting the mixture to further separation. When the mixture reaches the bottom portion of the apparatus it is directed upwardly, whereby additional heavier than air coating material is collected in a second chamber 13. The mixture 8 thereafter continues further along the wall 14, which gradually turns to reverse its flow direction in a generally spiralling manner, thereby subjecting the mixture to further separation. Finally, the mixture abruptly changes its flow direction near the end of the spiral to separate any remaining coating material and collect it in a third chamber 15, and the purified air is then discharged through a duct 16. It is preferable that the separating plate 9 be movable horizontally and vertically to change its disposition angle. Furthermore, it is preferable that baffle boards 17 and 18 be provided below the air doctor 6 and the backing roll 5, respectively, so that by controlling these boards the amount of outside air flowing into the recovery apparatus may be controlled to thereby adjust the pressure in the apparatus.

Figure 4:
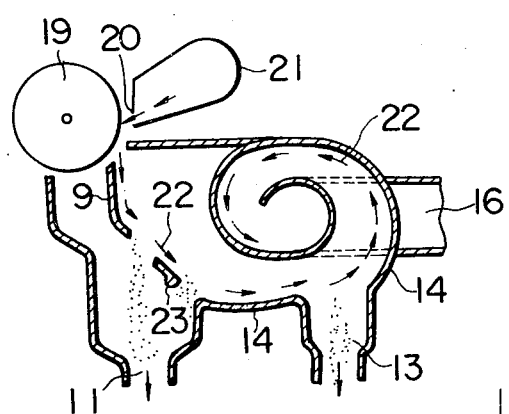
FIG. 4 shows a schematic sectional view of a sand recovery apparatus according to the invention.

Referring to the sand recovery embodiment shown in FIG. 4, sand 20 is blown under high pressure through a nozzle 21 against a rotating metallic roller 19 to abrade the surface thereof. The sand which has struck the surface is delivered together with air in a flow mixture 22 into the recovery apparatus, where the sand is separated out by centrifugal and gravitational force. The mechanism of separation and recovery is similar to that in the coating material recovery apparatus described above in connection with FIG. 3. It is preferable that a pivotally mounted guide board 23 be disposed at a position remote from the separating plate 9 but in the prolongation surface thereof to further facilitate separation.

Figure 5:
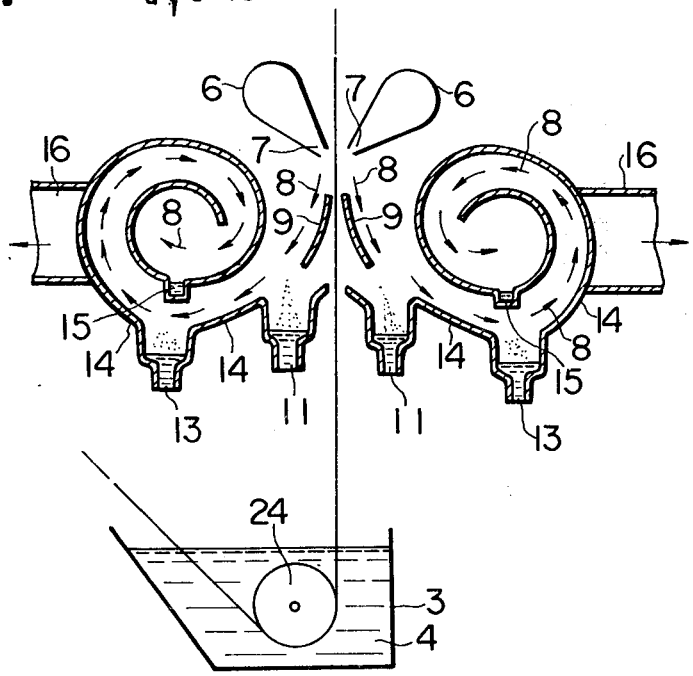

Referring to the coating material separation and recovery embodiment shown in FIG. 5, a continuously running web 1 is introduced into a coating material pan 3 by a guide roll 24 so that both of its surfaces are coated with coating material. Thereafter, jets from air doctors 6 are applied to the opposite surfaces of the web so that the amount of remaining coating material is a predetermined value and the two coated surfaces are smooth and uniform. Air mixtures 8 contain the removed coating material are introduced into the respective apparatuses where the coating material is separated from the air flows and recovered. The two identical recovery apparatuses are symmetrically disposed on opposite sides of the web. The construction and operation of each of the two apparatuses is similar to that of the recovery apparatus shown in FIG. 3.

In most cases air is jetted from the air doctor 6; however, nitrogen or other gases may be employed depending on the kinds of coating material and the operating conditions. Furthermore, an exhaust fan may be coupled to the outlet duct 16 of the recovery apparatus to forcibly withdraw the gas and thereby improve the recovery efficiency.

This invention provides the following novel effects or features:

(1) The gas mixture flows along a smoothly contoured prolongation surface without directly or sharply striking against the walls of the apparatus. This avoids the scattering of coating material or sand caused by such wall collision or impact, avoids any separation efficiency reduction caused by the separated coating material or sand being mixed again or recombined with the gas flow, and avoids any separation efficiency reduction due to pressure loss and/or decreased flow rate.

(2) The gas mixture flow is always urged toward the wall of the apparatus by centrifugal force to thus increase the separation efficiency.

(3) Because of the high separation and recovery efficiency the coating material or sand can be effectively reused, and there is no risk of contaminating the working environment or associated equipment with coating material or sand.

What is claimed is:

1. In an apparatus for separating and recovering particles entrained in a flowing gas mixture having a gas mixture inlet and including a separating plate disposed with respect to said inlet such that the flowing gas mixture is directed along one of its surfaces and a first recovery chamber disposed below the end of said plate, the improvement comprising:
 (a) means defining a generally inwardly spiraling flow path having an inner and an outer wall and a decreasing radius of curvature and positioned with respect to said separator plate such that an entrance surface of the outer wall of said flow path lies substantially in the prolongation plane of said separating plate,
 (b) at least one further recovery chamber means disposed in an intermediate position in said flow path defining means, and
 (c) exhaust duct means coupled to the terminus of said flow path defining means.

2. An apparatus as defined in claim 1, wherein said flow path defining means including an outer turn portion and an inner turn portion and said at least one further recovery chamber means comprising two further recovery chamber means, one being disposed at the bottom of said outer turn portion of said flow path defining means proximate said first chamber and the outer being disposed at the bottom of said inner turn portion of said flow path defining means proximate the terminus thereof.

3. An apparatus as defined in claim 1, wherein a movable guide plate is disposed at a position between said separating plate and said entrance surface of said flow path in the prolongation plane of said separating plate.

* * * * *